April 10, 1951     W. G. FROST     2,548,012
GARDEN TOOL
Filed Feb. 15, 1946
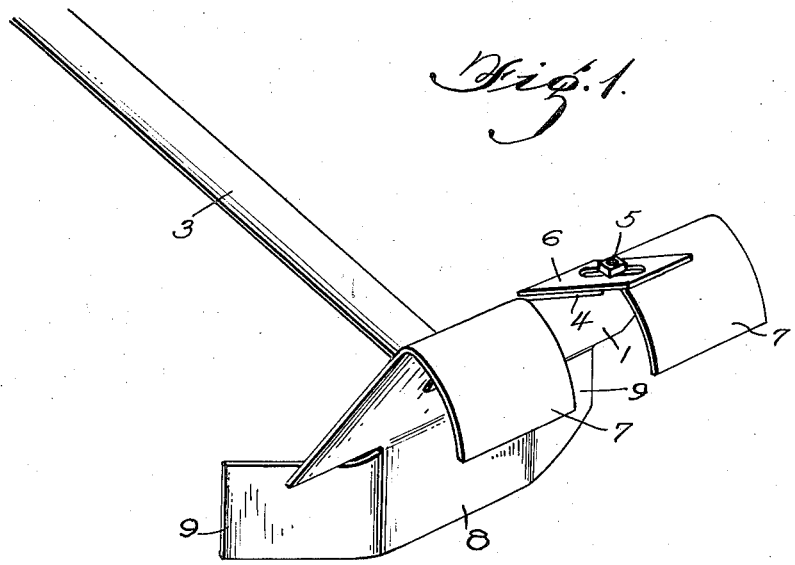
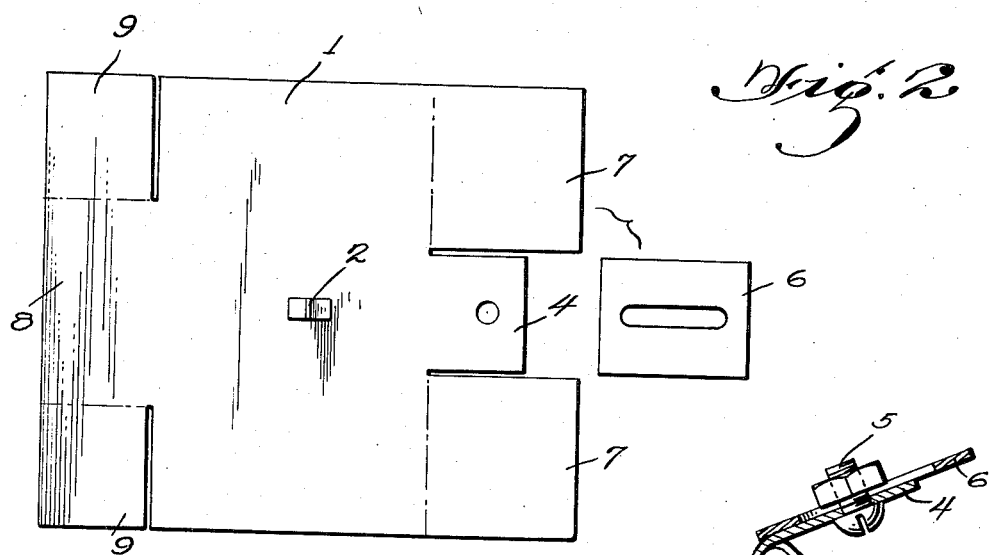
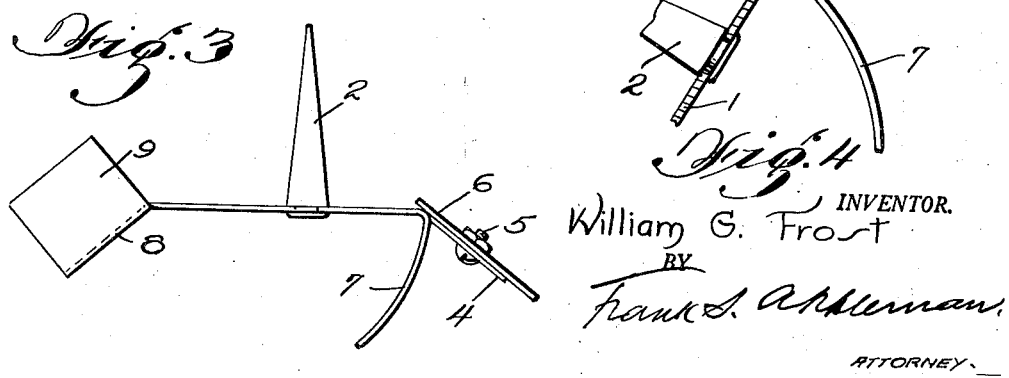
INVENTOR.
William G. Frost
BY
Frank S. Alderman
ATTORNEY.

Patented Apr. 10, 1951

2,548,012

UNITED STATES PATENT OFFICE 2,548,012

GARDEN TOOL

William G. Frost, Portageville, N. Y.

Application February 15, 1946, Serial No. 647,727

1 Claim. (Cl. 97—66)

This invention relates generally to agricultural implements, and more particularly to a garden tool.

An object of this invention is to provide a tool of the character indicated which is effective to form furrows for the planting of seed or the like, in which the said furrows have flat bottoms so that the seed will be prevented from moving or piling, one on the other, as they do when planted in V-shaped furrows.

A further object of this invention is to provide a means for displacing the soil to form the furrow, and an auxiliary means for leveling the bottom of the furrow while the tool is being manipulated, the said leveling means being adjustable to produce furrows of different depths.

The foregoing objects are attained by using the tool in position so that the structural features on one edge thereof are employed for forming the furrow, whereas the said tool has a compound function by reason of the formation of furrow-closing elements on the other edge of the head or plate thereof, and the said furrow-closing element comprises a scraper formed integral with the head and shaped to dislodge the soil or earth in a manner to push the earth so that it covers the seed in the furrow and at the same time forms a channel or gutter over the seed, which gutter is intended to retain moisture at a location where it will serve to aid in the germination of the seed.

A further object of this invention is to produce a compound tool of the character indicated which can be constructed or made almost in its entirety by the well known stamping and bending processes so that it can be inexpensively produced, and the device has proven strong and durable, as well as efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a view in perspective showing a cultivating tool embodying the invention;

Figure 2 illustrates a plan view of the blank and parts associated therewith from which the tool is constructed;

Figure 3 illustrates a view in side elevation of the tool; and

Figure 4 illustrates a sectional view of a fragment thereof.

In these drawings 1 denotes a main head or plate having a spur or spike 2 anchored to it and projecting outwardly therefrom, to which a handle 3 is attached, the said handle in practice being preferably about four feet in length.

One edge of the plate is cut away at the center to form an arm 4 which stands at an angle to the plate, and the said arm is apertured to receive a bolt 5 on which an extension plate or scraper 6 is adjustable, it being shown that the scraper plate has a slot which permits the plate to be extended beyond the arm to a greater or less extent, depending upon the depth of the furrow to be formed by the plate. Shovel-like extensions 7 are integral with the head and they are curved inwardly to a slight extent at their lower ends, and when the implement or tool is manipulated, these shovels displace the earth or soil to form a furrow, whereas the plate operating in a space between the inner edges of the shovels levels the bottom of the furrow and thus the seed can be distributed in the furrow so that it lies evenly therein and does not become superimposed, as is the case where seed is delivered to furrows having a V-shape.

It will thus be seen that by using the implement with one edge elevated, the shovels and plate will perform the functions stated in a satisfactory manner. After the seeding has finished, the implement can be employed by tilting the head so that the scrapers thereon will cover the seed and form a trench thereover. To perform this function, the edge of the plate has an extension 8 which is slanted downwardly to a proper angle and at the edges of the downwardly extending portion, the material is flared upwardly to form scraping blades 9 which dislodge the soil, whereas the central portion levels the bottom of the furrow above the seed, and in this way a trench-like covering of the seed results.

I claim:

In a cultivating tool of the character described, a plate having side edges and end edges, means on the plate intermediate the side edges and end edges for receiving a handle, a pair of spaced flanges along one end edge of the plate and curving downwardly therefrom with the free ends of the flanges beneath the plate, an arm on said end edge of the plate in the space between the flanges of lesser length than the flanges and inclined downwardly with respect to the plate, a blade adjustably mounted on the arm for movement toward and away from the said edge of the plate, the free end edge of the plate being inclined downwardly with respect to the plate at the same angle as that of the arm, said last named downwardly inclined portion being provided with opposed slits extending inwardly from the side edges of the plate at the juncture of said inclined portion to the plate to form end portions adapted to be bent upwardly with respect to the downwardly inclined portion and the said upwardly bent end portions serving to move soil inwardly to cover a furrow, with the downwardly inclined portion between the end portions operative to level the soil and form a trough-like covering for seed deposited in the furrow.

WILLIAM G. FROST.

REFERENCES CITED

The following references are of record in the file of this patent:

UNITED STATES PATENTS

| Number | Name | Date |
|---|---|---|
| 2,243,127 | Roseman | May 27, 1941 |
| 2,400,241 | Linden | May 14, 1946 |

FOREIGN PATENTS

| Number | Country | Date |
|---|---|---|
| 13,019 | Great Britain | June 10, 1903 |